US010385992B2

(12) United States Patent
Skarnes (10) Patent No.: US 10,385,992 B2
(45) Date of Patent: Aug. 20, 2019

(54) MODULAR BUOYANCY ELEMENT

(71) Applicant: NEXANS, Courbevoie (FR)

(72) Inventor: Gunnar Skarnes, Halden (NO)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 15/720,560

(22) Filed: Sep. 29, 2017

(65) Prior Publication Data

US 2018/0094749 A1    Apr. 5, 2018

(30) Foreign Application Priority Data

Oct. 4, 2016 (EP) ..................................... 16306299

(51) Int. Cl.
    *F16L 1/24*      (2006.01)

(52) U.S. Cl.
    CPC ..................................... *F16L 1/24* (2013.01)

(58) Field of Classification Search
    CPC ......... F16L 1/24; E21B 17/015; E21B 17/012
    See application file for complete search history.

(56) References Cited

U.S. PATENT DOCUMENTS

| 5,330,378 A | 7/1994 | Park |
| 6,030,145 A | 2/2000 | Stewart, Jr. et al. |
| 2008/0112762 A1* | 5/2008 | van Zandwijk ........... F16L 1/19 405/166 |
| 2009/0293338 A1 | 12/2009 | Lu |
| 2011/0174494 A1* | 7/2011 | Whitelaw ........... E21B 17/1035 166/364 |
| 2013/0280973 A1* | 10/2013 | Elder ........................ F16L 1/24 441/133 |
| 2016/0348809 A1* | 12/2016 | Elder ........................ F16L 1/24 |

FOREIGN PATENT DOCUMENTS

GB     2459553 A    *   11/2009     ........... E21B 17/012

OTHER PUBLICATIONS

European Search Report dated Apr. 4, 2017.

* cited by examiner

*Primary Examiner* — Anthony D Wiest
(74) *Attorney, Agent, or Firm* — Sofer & Haroun, LLP (57) ABSTRACT

A buoyancy element has a plurality of buoyancy modules interconnected to form a buoyancy element around the electrical cable or pipeline. A first buoyancy module is provided with at least one first fastening element and a second buoyancy module is provided with at least one second fastening element. The first fastening element has a snap element that snaps onto the second fastening element when the first buoyancy module is secured to the second buoyancy module. The buoyancy module has both the first fastening element and the second fastening element, oriented such that two identical buoyancy modules may be clamped together, whereby mutually cooperating first and second fastening elements of the respective modules align in locking engagement. This reduces production costs, as only a single type of module needs to be manufactured.

7 Claims, 8 Drawing Sheets

MODULAR BUOYANCY ELEMENT

RELATED APPLICATION

This application claims the benefit of priority to European Patent Application No. 16 306 299.5, filed on Oct. 4, 2016, the entirety of which is incorporated by reference.

BACKGROUND

Field of the Invention

The present invention relates buoyancy elements for an electrical subsea cable or a subsea pipeline, and in particular to the fastening of buoyancy modules comprising such a buoyancy element to each other.]

Description of Related Art

Buoyancy elements used to provide buoyancy to cable and pipelines and similar tubular shaped elements such as risers, which are arranged in a body of water, are well known in the art. Such buoyancy elements are usually made of two molded modules which are arranged around the cable, pipeline etc., whereafter the two modules are secured to each other, commonly with bolts connecting the two modules or with a number of bands which are arranged around the two modules and then tightened. Such modules often comprise hollow plastic or glass balls molded into the material of the buoyancy element to provide the desired buoyancy. A typical example is shown in the patent publication U.S. Pat. No. 6,030,145 where two such buoyancy modules are connected to each other using bolts.

Using bolts or straps to interconnect the modules of a buoyancy element is a time consuming process. The buoyancy elements are arranged on the cable or pipeline during the laying process and the installation time of the cable or pipeline is therefore increased considerably when such buoyancy elements are mounted on the cable or pipeline. When cables and pipelines are installed, a special pipe or cable laying vessel is used. Such vessels can be very costly to hire and any reduction of the time required to install the cable or pipeline will therefore involve considerable cost savings.

OBJECTS AND SUMMARY

One object of the present invention is therefore been to reduce the time, and thereby cost of installing a subsea cable or a subsea pipeline. Another object of the invention is to provide an alternative buoyancy element. Yet another object of the invention is to provide an automated method for installing a buoyancy element about a cable or pipeline.

These objects are met with a buoyancy element and method as defined in independent claims. Further preferred embodiments of the invention are defined in the dependent claims.

According to one aspect, the invention provides a modular buoyancy element for an electrical cable or a pipeline where the buoyancy element comprises a through-going passage for the electrical cable or pipeline. According to one aspect, the through-going passage is provided with one or more clamp elements directed towards the interior of the passage and arranged to securely engage the cable or pipeline when the buoyancy element is assembled.

The buoyancy element comprises a plurality of, and preferably two, buoyancy modules interconnected to form a buoyancy element around the electrical cable or pipeline, wherein a first buoyancy module is provided with at least one first fastening element and a second buoyancy module is provided with at least one second fastening element, and wherein the first fastening element comprises a snap element that snaps into the second fastening element when the first buoyancy module is secured to the second buoyancy module.

According to one aspect, a single embodiment of the buoyancy module comprises both the first fastening element and the second fastening element, oriented such that two identical buoyancy modules may be clamped together, whereby mutually cooperating first and second fastening elements of the respective modules align in locking engagement. This aspect of the invention reduces production costs, as only a single type of module needs to be manufactured.

According to another aspect, the first and second fastening elements are integral parts molded into the material of the buoyancy module. The first and second fastening elements may alternatively comprise separate parts which are securely attached to the buoyancy modules.

According to one aspect, the first buoyancy module comprises a first inner surface facing and essentially adjacent to a corresponding second inner surface on the second buoyancy module when the first and second buoyancy modules are secured to each other. The first fastening element and the second fastening element are provided on or in the first inner surface and the second inner surfaces of the buoyancy modules respectively.

The first fastening element comprises a hook member and the second fastening element comprises receptacle member having a though going opening that defines a shoulder part such that the hook member snaps into the opening and locks onto the shoulder part when the first fastening element is pressed against the second fastening element.

According to one aspect, the hook member comprises a stem which is elastic such that the hook member locks onto the shoulder part in a neutral position and such that the hook member is capable of being displaced for releasing the hook member from the shoulder part. The through-going opening of the receptacle member provides access to the hook member and is adapted for receiving a release tool which can be put into and through the opening to release the hook member from the shoulder part in order for the first buoyancy module to be detached from the second buoyancy module.

According to one aspect, the inner surface of first buoyancy module and/or the second buoyancy module is provided with at least one recess while the inner surface of the other buoyancy module is provided with at least one corresponding protruding guide element arranged to be inserted into the recess for facilitating the correct alignment of the first buoyancy module and the second buoyancy module.

The invention further provides a method for mounting a modular buoyancy element on an electrical cable or a pipeline where the buoyancy element comprises a through-going opening for the electrical cable or pipeline, wherein the buoyancy element comprises a plurality of buoyancy modules, the method comprising the following steps:

passing the subsea cable or subsea pipeline through a work station comprising at least one clamp device capable of holding and moving at least one buoyancy module,     arranging at least a first buoyancy module and a second buoyancy module around the subsea cable or subsea pipeline, at a desired position on the cable or pipeline actuating the clamp device to press the buoyancy modules together, such that at least one first fastening element, comprising a snap element which is provided on the first buoyancy module, is pressed towards and snaps into engagement with a second fastening element provided on the second buoyancy module, whereby the first buoyancy module is secured to the second buoyancy module and the buoyancy element is attached to the subsea electrical cable or subsea pipeline.

According to another aspect, the workstation of the method comprises a staging area in which is arranged a plurality of buoyancy modules for successive installation. The staging area according to one aspect may comprise a conveyor belt that sequentially moves buoyancy modules into position for pressing about the cable or pipeline by the clamp device. According this aspect, the conveyor and clamp device may be controlled by a data processing device to automate the installation of a plurality of buoyancy modules.

BRIEF DESCRIPTION OF THE DRAWINGS

Other features and advantages of the present invention will appear from the following non-limiting description of a preferred embodiment of the invention, with reference to the figures, where.

DETAILED DESCRIPTION

Figure 4:
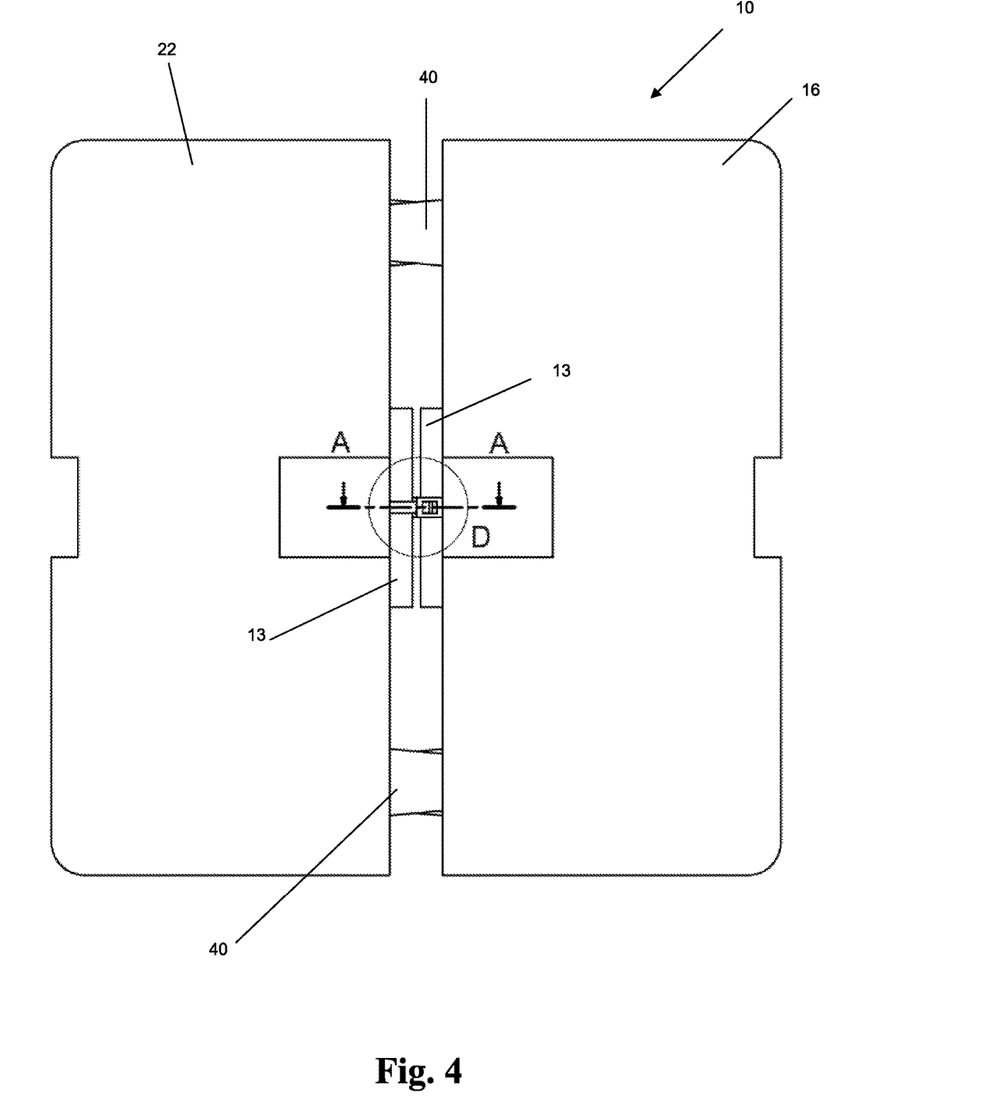
FIG. 4 illustrates a buoyancy element according to the present invention as seen from the side, including a first buoyancy module and a second buoyancy module which are connected to each other.
Figure 7:
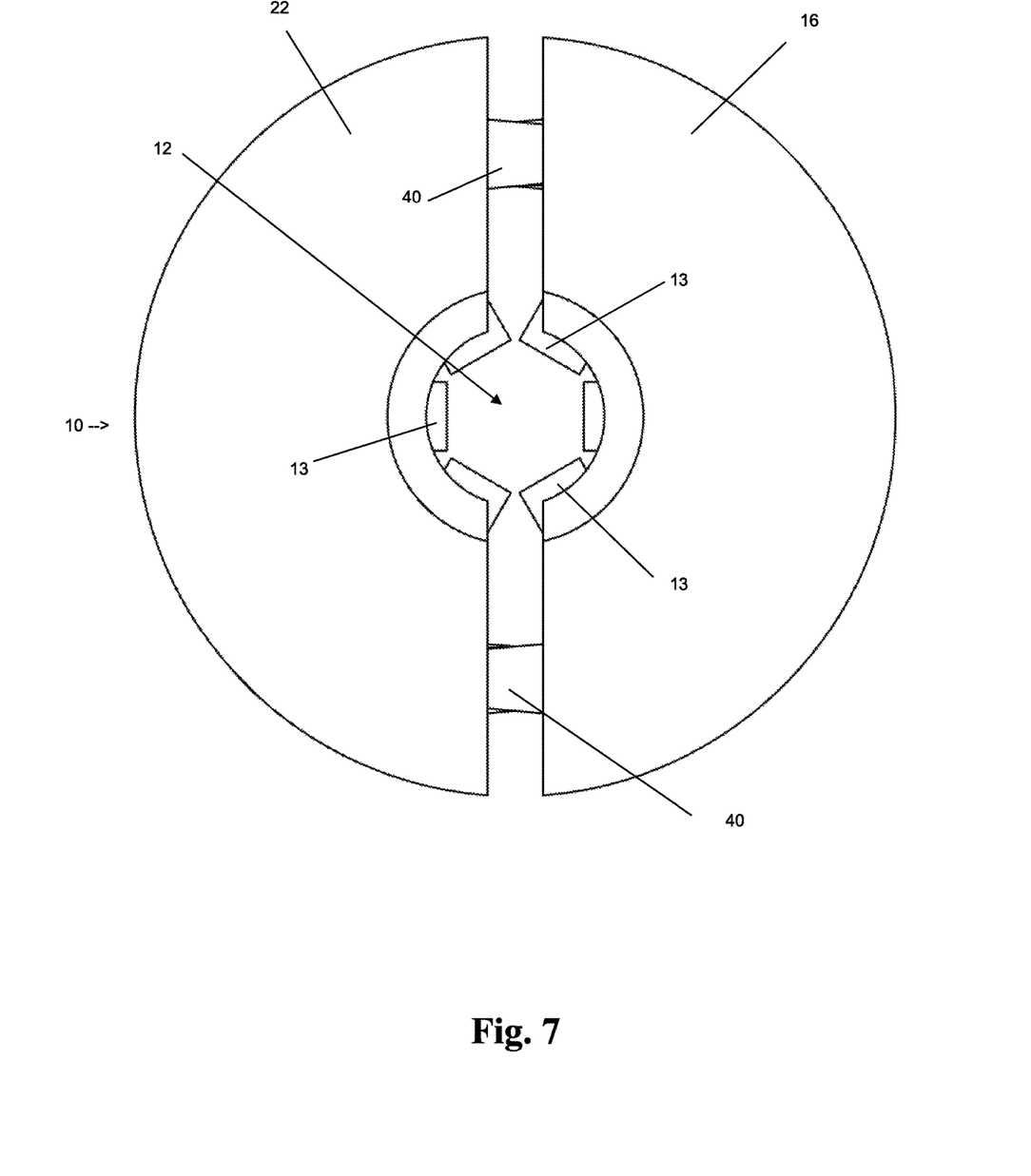
FIG. 7 illustrates a buoyancy element according to the present invention as seen from the top, including a first buoyancy module and a second buoyancy module which are connected to each other.
Figure 8:
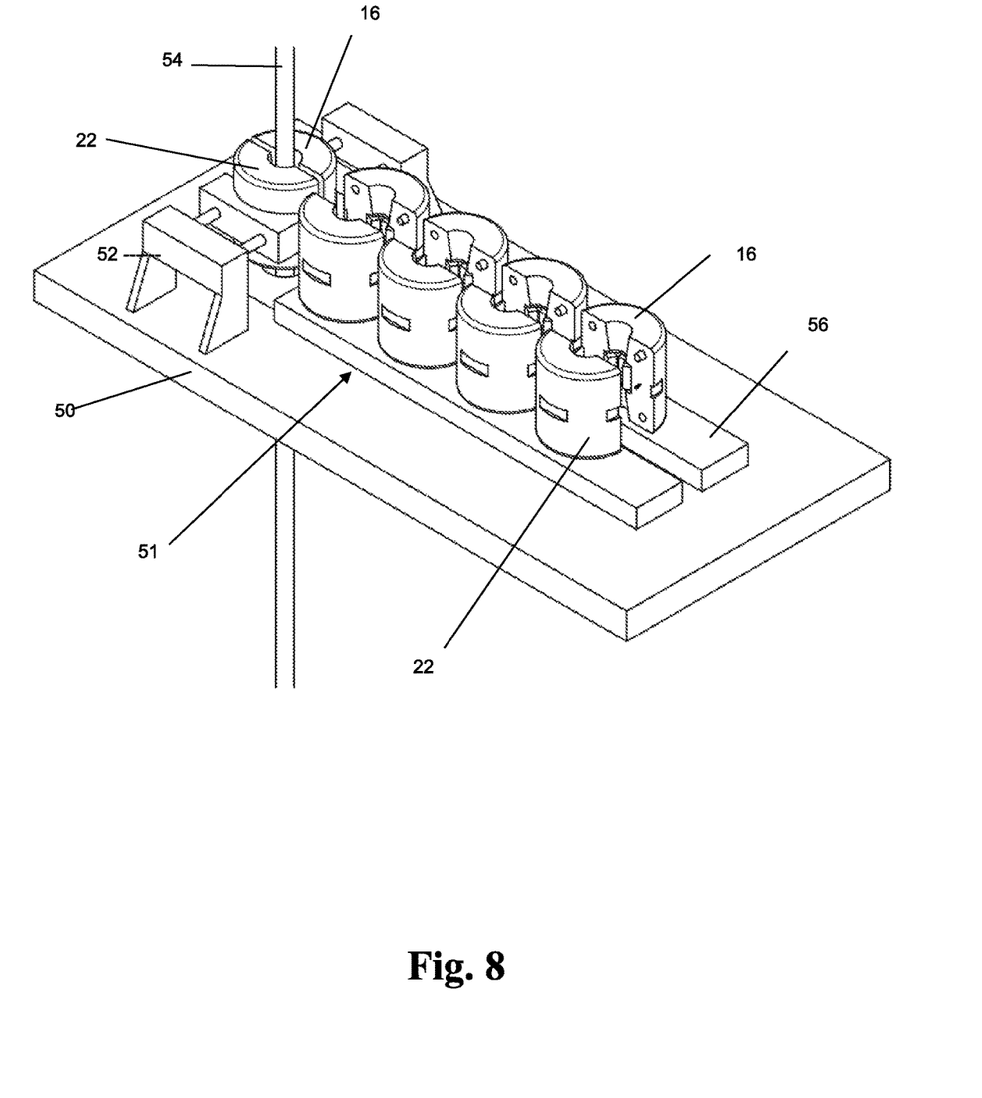
FIGS. 8, 9 and 10 illustrate a work station and staging area used in a method for the installation of a plurality of buoyancy elements.

As shown in FIGS. 4, 7 and 8, the buoyancy element 10 of the invention comprises a first buoyancy module 16 connected to a second buoyancy module 22. According to one aspect, both the first and second buoyancy modules are identical. An embodiment of the buoyancy modules is illustrated in FIG. 1, illustrated as first buoyancy module 16.

Figure 1:
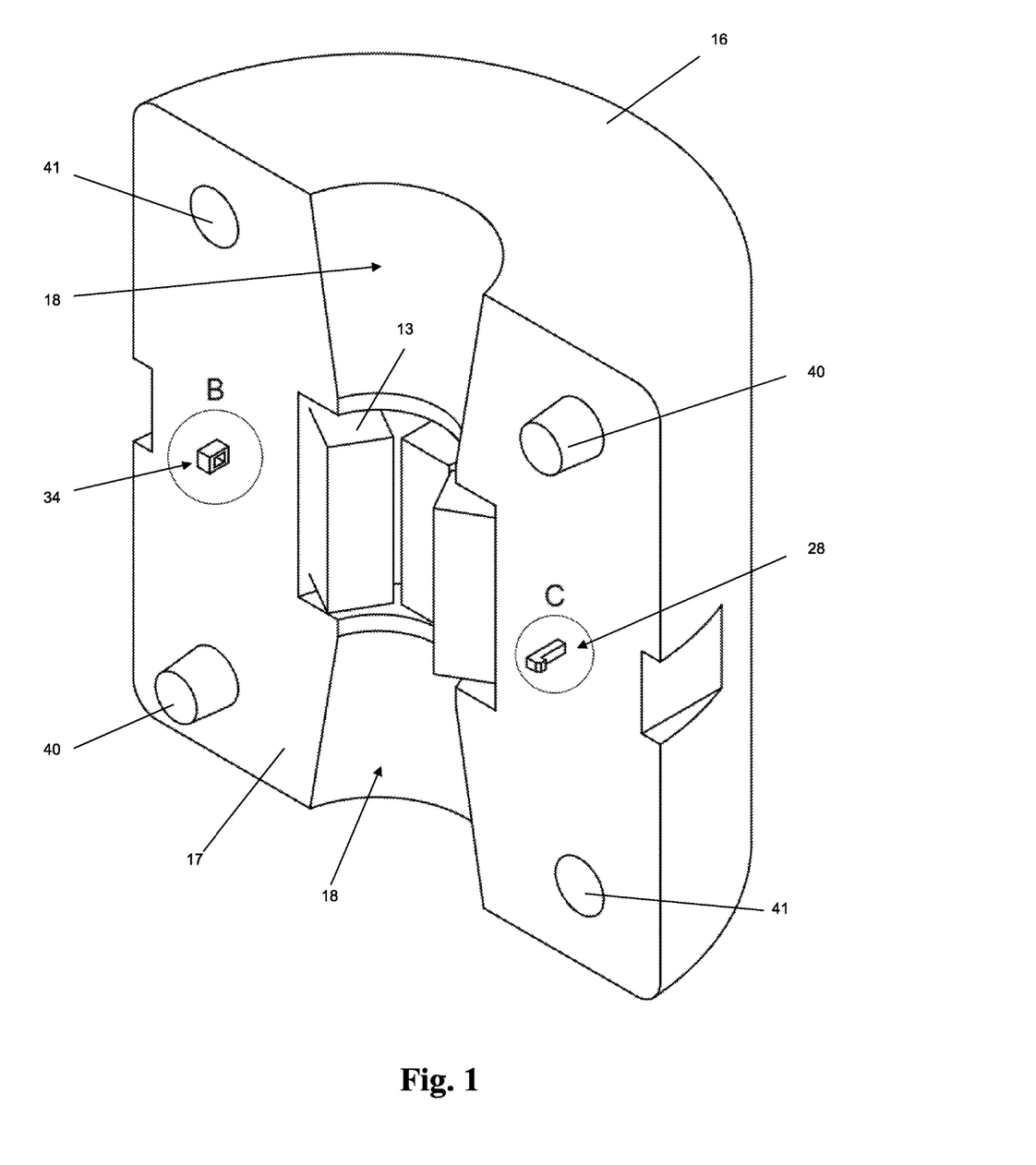
FIG. 1 is a perspective view of an embodiment of a buoyancy module comprising the buoyancy element according to the present invention.

According to the embodiment shown in FIG. 1, first buoyancy module 16 is an essentially semi-cylindrical body having a semi-cylindrical cavity 18. Semi-circular cavities 18 of two interconnected modules cooperate to form an essentially cylindrical through-going passage 12, as shown in FIG. 7, adapted for being fixed about a cable or pipeline 54. One or more clamping elements 13 are arranged within the semi-cylindrical cavity 18, projecting towards the interior of through-going passage 12 of an assembled buoyancy element 10 as shown in FIG. 7. Clamping elements 13 are adapted to engage the cable or pipeline 54 in a secure manner, such as by friction forces.

Figure 2:
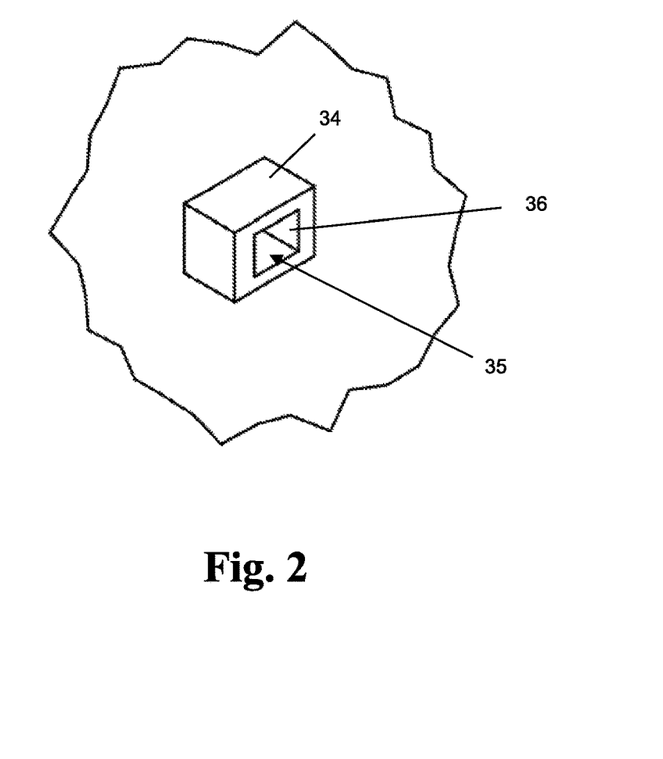
FIG. 2 illustrates a second fastening element as shown in a portion within circle B of the modular buoyancy module shown in FIG. 1.
Figure 3:
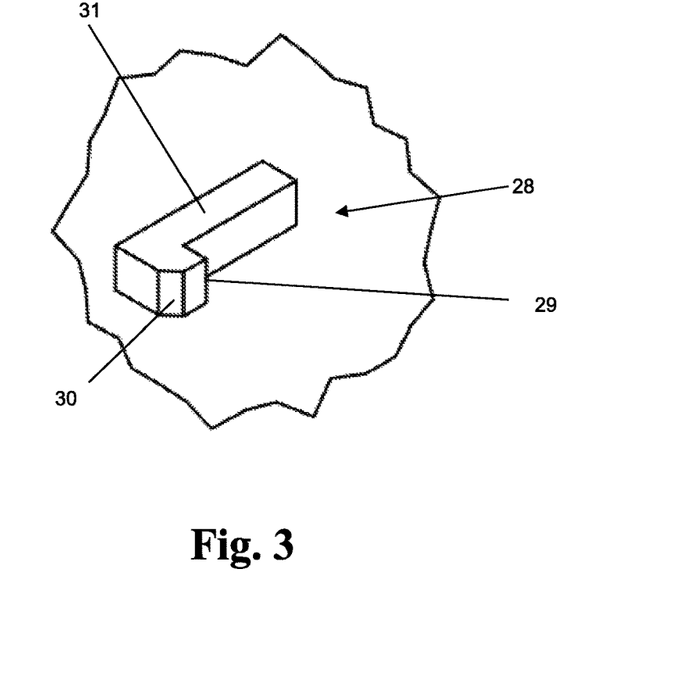
FIG. 3 illustrates a first fastening element as shown in a portion within circle C of the modular buoyancy module shown in FIG. 1.

First buoyancy module 16 has a first inner surface 17 that aligns essentially adjacent to a corresponding inner surface of a second buoyancy module of an assembled buoyancy element 10. On a first part of inner surface 17 is arranged a first fastening element 28. First fastening element 28 is illustrated in detail in FIG. 3, and comprises stem 31 at the end of which is a hook member 29. Hook member 29 preferably has a sloped front part 30. On a second part of inner surface 17 is arranged a second fastening element 34. Second fastening element 34, illustrated in detail in FIG. 2, is a receptacle member adapted for receiving the hook member 29 of first fastening element 28 from a second buoyancy module 22. Second fastening element 34 comprises a through-going opening 35 leading to a shoulder part 36.

Figure 5:
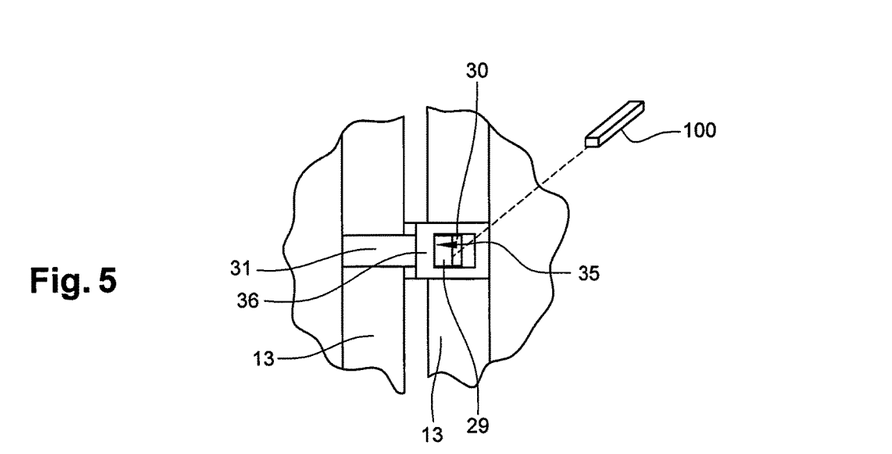
FIG. 5 illustrates the portion within circle D in FIG. 4 where the first fastening element has snapped into locking engagement with the second fastening element.
Figure 6:
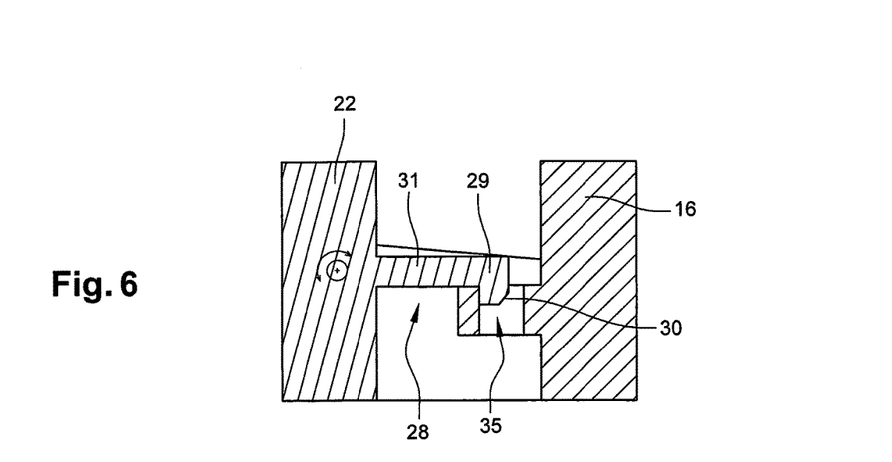
FIG. 6 illustrates section A-A of the portion within circle D in FIG. 4 showing the hook member of the first fastening element engaging the shoulder part of the second fastening element.

When two modules are pressed towards each other, first fastening element 28 aligns with and is pressed along an inner side of second fastening element 34, distending hook member 29 inwardly. As the modules are further pressed together, hook member 29 will snap into opening 35 and engage shoulder part 36 in locking engagement, as shown in FIG. 5. Stem 31 of first fastening element 28 is preferably made of an elastomeric material with a degree of flexibility sufficient bend and snap into a locking, neutral position whereby hook member 29 engages shoulder part 36. Sloping part 30 is arranged to make initial contact with second fastening element 34, thus facilitating the bending motion of stem 31. While the forgoing is a description of an embodiment of a snap connection arrangement, it should be understood that other snap arrangements are within the scope of the invention.

First inner surface 17, according to one aspect, is provided with means for assuring proper alignment of two interconnected buoyancy modules. The alignment means comprise one or more outwardly projecting guide elements 40, adapted to be inserted into a corresponding recess 41 of a respective second buoyancy module 22. According to a preferred embodiment, both first and second buoyancy modules 16 and 22 are identical, an embodiment of which is illustrated in FIG. 1. According to this aspect, the module comprises both a first and second fastening element 28,34 and guide elements and recesses 40,41. These components, as illustrated in FIG. 1, are oriented such that when two identical buoyancy elements are pressed towards each other (with one of said modules rotated 180 degrees), the fastening elements and alignment means of the two modules align into mutual engagement. It should be understood, however, that it is possible for the first and second buoyancy modules to have different, but mutually cooperating components. For example, the first buoyancy module 16 may comprise solely the first fastening element 28, while second buoyancy element 22 may comprise solely the second fastening element 34.

Figure 9:
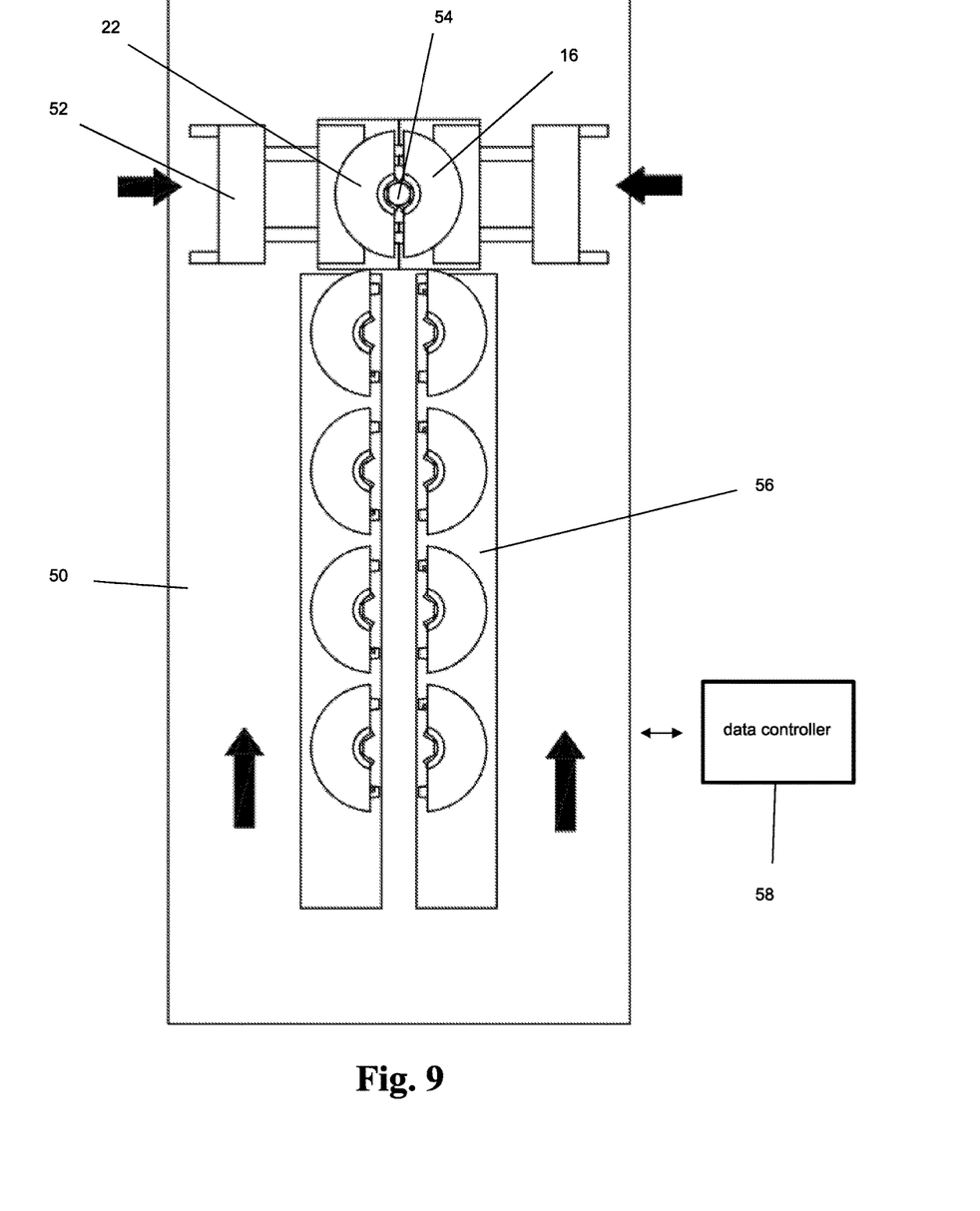
Figure 10:
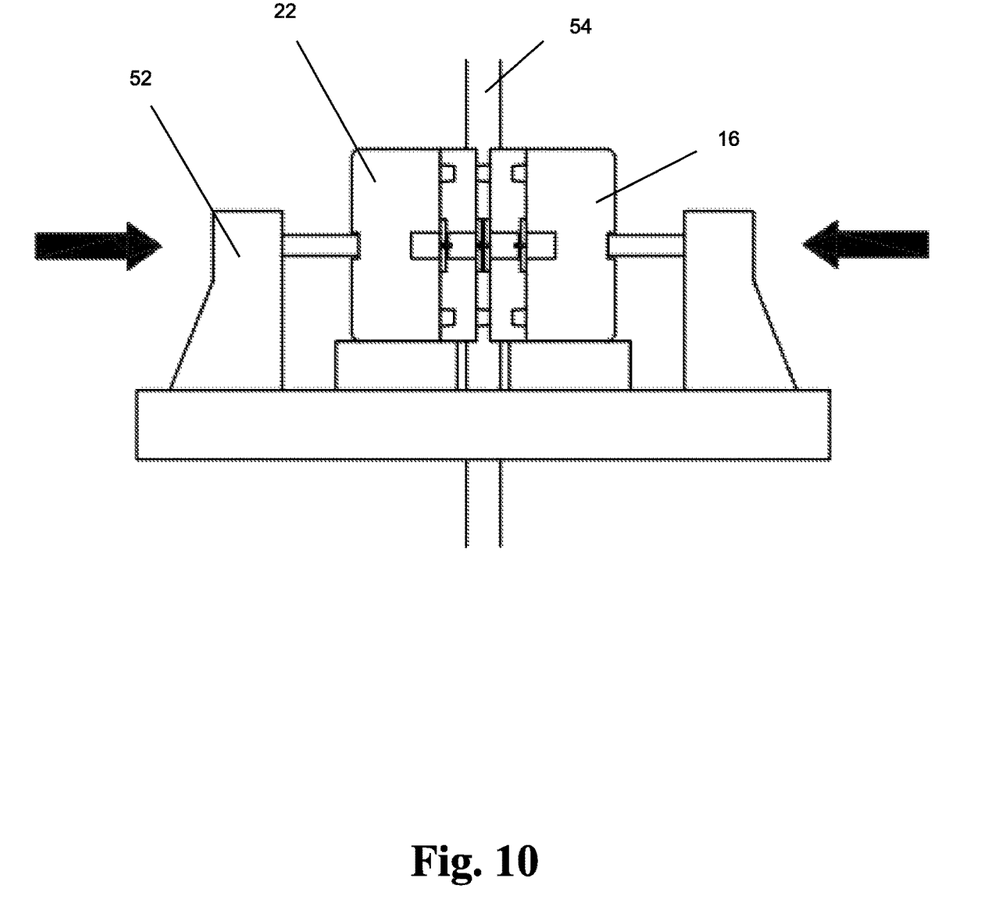

After a buoyancy element 10 is assembled, it may be desirable to disassemble the buoyancy element from about the cable or pipeline. According to one aspect, therefore, means are provided for simple disassembly. As shown in FIG. 5, through going opening 35 of second fastening element 28 leads to hook member 29. A removal tool 100 can thus be inserted in opening 35 in order to press hook 29 out of engagement with shoulder part 36. As shown in FIG. 4, an assembled buoyancy element 10 has a space between module 16 and module 22. This space provides access to second fastening element 34, such that the removal tool 100 can be inserted into opening 35 to disengage hook member 29 from should part 36. According to another aspect, the invention provides a method for the assembly of a plurality of buoyancy elements about a cable or pipeline. As shown in FIGS. 8, 9 and 10 the method comprises providing a workstation 50. Work station 50 comprises a clamping device 52. First and second buoyancy modules 16 and 22 are moved into position about a cable or pipeline 54 from a staging area 51. Clamping device 52 is thereafter actuated to clamp the modules together into locking engagement about cable or pipeline 54. Once a buoyancy element is assembled, the cable or pipeline is moved in a longitudinal direction exposing the next area where a buoyancy element is desired. A new set of buoyancy modules is then introduced into clamping device 52, and the procedure repeated. According to one aspect, a conveyor belt 56 sequentially moves modules into the clamping device, in an automated process where modules are sequentially secured to cable or pipeline 54.

A data controller 58, conceptually illustrated in FIG. 9, is programmed to record the longitudinal movement of cable 54, temporarily halt such longitudinal movement, actuate clamp device 52, move cable or pipeline a predetermined longitudinal distance, cause conveyor belt 56 to move a new set of modules into clamp device 52, temporarily halt such longitudinal movement, and actuate clamp device 52 again, thus sequentially clamping a plurality of modules about cable or pipeline 54.

The invention claimed is:

1. A modular buoyancy element for an electrical cable or a pipeline, having a through-going passage for the electrical cable or pipeline, said buoyancy element comprising:
    a plurality of buoyancy modules arranged to be assembled together around the electrical cable or the pipeline thus forming the buoyancy element,
    wherein a first buoyancy module is provided with at least one first fastening element arranged on a first inner surface and a second buoyancy module is provided with at least one second fastening element arranged on a second inner surface, the second fastening element adapted for receiving the first fastening element in a snap engagement,
    wherein the first buoyancy module comprises an outwardly protruding guide element from its inner surface, and the second buoyancy module comprises a corresponding recess for receiving guide element, wherein said guide element and said corresponding recess are distinct from said at least one first and second fastening elements,
    wherein the first fastening element comprises an elastic stem with hook member that snaps into locking engagement with a shoulder part of the second fastening element when the first buoyancy module is secured to the second buoyancy module, and
    wherein the second fastening element comprises an opening leading to said hook member, said opening adapted to receive a removal tool for disengaging the hook member from the shoulder part.

2. Buoyancy element according to claim 1, wherein the first buoyancy module and the second buoyancy module are identical, each comprising both a first and second fastening element, said fastening elements oriented such that the first fastening element of first buoyancy module aligns with the second fastening element of second buoyancy module when second buoyancy module is rotated 180 degrees with respect to buoyancy module.

3. Buoyancy element according to claim 1, wherein the buoyancy modules comprise a semi-cylindrical cavity that cooperate with a respective semi-cylindrical cavity of a respective buoyancy module to form the through-going passage, said semi-cylindrical cavities being provided with one or more clamping elements projecting towards the interior of said through-going passage, said clamping elements adapted to securely engage the cable or pipeline when the buoyancy modules are assembled.

4. Buoyancy element according to claim 1, wherein said hook member has a front sloping surface.

5. A method for mounting a modular buoyancy element on an electrical cable or a pipeline where the buoyancy element comprises a through-going passage for the electrical cable or pipeline, wherein the buoyancy element comprises a plurality of buoyancy modules according to claim 1, the method comprising the following steps:
    passing the subsea cable or subsea pipeline through a work station comprising at least one clamping device capable of holding and moving at least one buoyancy module,
    introducing a first and second buoyancy module into the clamping device,
    actuating the clamping device to press the first buoyancy module into locking engagement with the second buoyancy module around the subsea cable or subsea pipeline,
    longitudinally moving the cable or pipeline in relation to work station,
    repeating steps of passing the subsea cable or subsea pipeline through a work station, of introducing a first and second buoyancy module, of locking engagement and longitudinally moving the cable or pipeline until a desired number of buoyancy elements are attached to the cable or pipeline.

6. The method according to claim 5, wherein the workstation comprises a conveyor belt for sequentially introducing buoyancy modules into the clamping device.

7. The method according to claim 5, wherein the method is an automated method controlled by a data controller arranged to control the longitudinal movement of the cable or pipeline, the actuating of the clamp device, and the operation of the conveyor belt.

* * * * *